(12) United States Patent
Thomas et al.

(10) Patent No.: US 11,067,364 B1
(45) Date of Patent: Jul. 20, 2021

(54) TWO-PART COMPOSITE SCOPE (71) Applicant: Garmin International, Inc., Olathe, KS (US)

(72) Inventors: Mark Thomas, Portland, OR (US); Mitchell Thomas, Tigard, OR (US)

(73) Assignee: Garmin International, Inc., Olathe, KS (US)

(*) Notice: Subject to any disclaimer, the term of this patent is extended or adjusted under 35 U.S.C. 154(b) by 279 days.

(21) Appl. No.: 16/275,754

(22) Filed: Feb. 14, 2019

Related U.S. Application Data (60) Provisional application No. 62/636,525, filed on Feb. 28, 2018.

(51) Int. Cl.
| | |
|---|---|
| *F41G 1/38* | (2006.01) |
| *G02B 25/00* | (2006.01) |
| *G02B 23/16* | (2006.01) |
| *B29C 45/00* | (2006.01) |

(52) U.S. Cl.
CPC ............ *F41G 1/38* (2013.01); *G02B 23/16* (2013.01); *G02B 25/001* (2013.01); *B29C 45/0005* (2013.01)

(58) Field of Classification Search
CPC ..... F41G 1/38; B29C 45/0005; G02B 25/001; G02B 23/16
USPC ......... 359/399–435; 42/111–148; 285/334.2, 285/334.4, 334.5, 330, 332–332.1
See application file for complete search history.

(56) References Cited

U.S. PATENT DOCUMENTS

| | | | |
|---|---|---|---|
| 2,819,527 A * | 1/1958 | Spurling | F41G 1/54 |
| | | | 359/428 |
| 3,121,134 A | 2/1964 | Heinzel | |
| 3,495,627 A | 2/1970 | Pierpont | |
| 3,696,516 A * | 10/1972 | Thompson | F41G 1/38 |
| | | | 42/119 |
| 3,902,251 A | 9/1975 | Ross | |
| 4,849,150 A | 7/1989 | Kittaka | |
| 4,950,064 A | 8/1990 | Akin | |
| 5,231,535 A | 7/1993 | Peters | |
| 6,005,711 A * | 12/1999 | Mai | G02B 15/1421 |
| | | | 359/424 |
| 7,676,137 B2 | 3/2010 | Schick | |
| 2002/0191282 A1 | 12/2002 | Edwards | |
| 2006/0066963 A1 | 3/2006 | Sudoh | |
| 2006/0107579 A1 | 5/2006 | Thomas | |
| 2006/0262391 A1 | 11/2006 | Thomas | |

(Continued)

FOREIGN PATENT DOCUMENTS

EP     0008000 A * 2/1980 ............. F16L 37/06

*Primary Examiner* — George G King
(74) *Attorney, Agent, or Firm* — Samuel M. Korte; Max M. All (57) ABSTRACT

A method of producing a rifle scope and a rifle scope including a conical objective bell, a main tube, and a connector. The objective bell is made of composite materials and increasing in diameter as the bell extends distally from its proximal to its distal end, with the proximal end being adjacent to the distal end of the main tube. The main tube, also constructed of composite materials, is a hollow cylinder. The connector is positioned about the distal end of the main tube with an exterior surface that conforms and is adhered to the interior surface of the proximal end of the objective bell and the interior surface of the distal end of the main tube, thereby joining together the objective bell and the main tube.

10 Claims, 8 Drawing Sheets

(56) References Cited

U.S. PATENT DOCUMENTS

| | | |
|---|---|---|
| 2008/0218881 A1 | 9/2008 | Regan et al. |
| 2009/0038203 A1 | 2/2009 | McCarty |
| 2010/0032081 A1 | 2/2010 | Green |
| 2010/0170136 A1 | 7/2010 | Buckingham |
| 2011/0041377 A1 | 2/2011 | Thomas |
| 2011/0023152 A1 | 9/2011 | Thomas et al. |
| 2012/0061131 A1 | 3/2012 | Lee |
| 2013/0129409 A1 | 5/2013 | Cho |
| 2013/0212922 A1 | 8/2013 | Thomas |
| 2014/0218718 A1 | 8/2014 | Mander |
| 2015/0143733 A1* | 5/2015 | Thomas .................... F41G 1/38 42/119 |

* cited by examiner

TWO-PART COMPOSITE SCOPE

BACKGROUND

1. Field of Invention

The invention is generally in the field of optical devices. More specifically, the present teachings relate to a scope for mounting to a firearm to provide a gun sight.

2. Description of the Related Art

Scopes have practical applications in various fields. They are often used for aiming devices, such as firearms. In this exemplary use, the scope may be mounted to a firearm, such as a rifle, so that the user can peer through the scope to view the target up close.

The Traditional telescopic sighting system (scope) is a tube made of steel or aluminum, having an expanded front (objective) and rear (ocular) section. The objective section houses an objective lens, while the ocular section houses an ocular lens or eyepiece. Customarily, scopes are further outfitted with an erector system, disposed within the body, to flip the inverted image of a target created by the objective and ocular lenses. Between the objective and the erector tube, some scopes include an intermediate lens such as a Petzval or Barlow lens which projects the image formed by the objective lens onto an intermediate focal plane.

Although this design has many advantages, the traditional steel or aluminum system body often results in a heavier rifle scope than is ideal for some applications. Newly developed methods of producing a rifle scope having a body made in part of composite material and in part of metal have resulted, in some embodiments, in lighter rifle scopes. These methods, however, encounter a challenge in avoiding wrinkling of the composite material where the objective bell meets the ocular section of the rifle sighting system body.

SUMMARY

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

In a first embodiment, the present invention may take the form of a scope assembly that includes a conical objective bell, a main tube, and a connector. The objective bell is made of composite materials and increasing in diameter as the bell extends distally from its proximal to its distal end, with the proximal end being adjacent to the distal end of the main tube. The main tube is a hollow cylinder, with a substantially constant diameter. The connector is positioned about the distal end of the main tube with an exterior surface that conforms to the interior surface of the proximal end of the objective bell and the interior surface of the distal end of the main tube, with the exterior surface adhered by an adhesive to the interior surface of the main tube, thereby joining together the objective bell and the main tube. At the proximal end of the main tube is an eyepiece, and an optical train is interlaid between the eyepiece and the distal end of the tube.

In a second embodiment, the present invention may take the form of a method of making a scope assembly. The method utilizes: an objective bell, made of composite material with a circular sidewall and having a diameter that increases from its proximal to distal end; a main tube with a circular sidewall having a constant diameter; and a connector having an exterior surface that conforms to the interior surfaces of the proximal end of the objective bell, and the distal end of the main tube. The distal end of the main tube is placed adjacent to the proximal end of the objective bell. A connector is positioned about the distal end of the main tube and adhered to the interior surface of the main tube, thereby joining together the objective bell and the main tube.

In a third embodiment, the present invention may take the form of a method of making a scope assembly. The method utilizes a spud, and a metal connector fitted about one end of the spud such that the exterior surface of the spud and metal connector match a portion of the interior surface of the scope assembly. The spud and a connector are wrapped in fabric—leaving a portion of the metal connector unwrapped—and placed into a mold. A charge of resin is placed into the mold and the mold is heated to inculcate the resin throughout the fabric and cure the resin. On the spud, this forms a first composite material piece adhered to the connector. The composite material piece, connector, and spud are removed from the mold. The spud is removed from the composite material piece and the connector. A second composite material piece is adhered to the uncovered portion of the first composite material piece, such that the two composite material pieces are connected by the metal connector.

In a fourth embodiment, the present invention may take the form of a method of making a scope assembly. The method utilizes two spuds, with a metal connector fitted about an end of each of the spuds, such that ends of each spud are adjacent to each other. The external surface of the spuds and metal connector matches the interior surface of the scope assembly. One spud and a portion of the metal connector are wrapped in a piece of fabric. The other spud and a second portion of the metal connector are wrapped in a second piece of fabric, forming a work piece having two separately wrapped portions. The work piece is placed into a mold. A charge of resin is placed into the mold and heated to inculcate the resin throughout the fabric and cure to form the scope assembly. The work piece is removed from the mold and the spuds are removed from the scope assembly.

In a fifth embodiment, the present invention may take the form of a scope assembly that includes an objective bell, a main tube, and a lens holder. The Objective bell has a circular sidewall and a diameter that increases from the bell's proximal to distal ends. The main tube has a circular sidewall and a constant diameter. The distal end of the main tube is adjacent to the proximal end of the objective bell. The lens holder is positioned about the distal end of the main tube and has an exterior surface that conforms to the interior surfaces of the proximal end of the objective bell and the distal end of the main tube. The exterior surface of the lens holder is adhered by an adhesive to the interior surfaces of the main tube and objective bell, and the lens holder supports a lens.

In addition to the exemplary aspects and embodiments described above, further aspects and embodiments will become apparent by reference to the drawings and by study of the following detailed descriptions.

DETAILED DESCRIPTION OF THE PREFERRED EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description, with reference to the accompanying drawings, in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured. In the drawings, similar elements have similar reference numerals.

To assist the description of the scope and its components the coordinate terms "proximal" and "distal" are used to describe the disclosed embodiments. The terms are used consistently with the description of the exemplary applications and are in reference to the head of a user looking through the scope. In other words, proximal components are nearer to the user than distal components.

1. DEFINITIONS

When the term "metal" is used as a modifier in this application, it means that the item that is the object of the modifier is largely metal but could include other materials as well.

The term "spud" means inner molding core.

The term "composite material," as used in this application, means an engineered material made from two or more constituent materials with significantly different properties which remain separate and distinct within the finished structure. The term includes materials that combine a substrate of woven fibers, infused with a resin. The woven fibers may be made from carbon fibers, basalt fibers, glass fibers, or para-aramid synthetic fibers. The resin may include an epoxy, polyester, nylon, or vinyl ester. Also included are laminated materials made, at least in part, of composite material layers, and which may have a first layer or set of layers, made of a first composite material, and a second layer or set of layers, made of a second composite material. The terms "composite-material" and "composite" are modifiers indicating that the object of the modification interfaces with composite material.

The term "intermediate focus lens" refers to a lens placed between the objective lens and the erector tube. An intermediate focus lens projects the image from the objective lens onto the intermediate focal plane. Examples include Petzval or Barlow lenses.

The term "rifle" is used throughout this application, however one of ordinary skill in the art would appreciate that the disclosed scope could be attached to variety of firearms (handguns, carbines, etc.) or any other device (e.g., a crossbow, bow, etc.) that a user aims during operation. As such, wherever this application uses the term, "rifle" it should be understood that the term is merely an exemplary placeholder standing for any device that a user aims during operation.

The term "scope," as used in this application, refers to an optical sighting device including a telescopic sight based on a refracting telescope.

2. TWO-PART COMPOSITE RIFLE SCOPE ASSEMBLY

Figure 1:
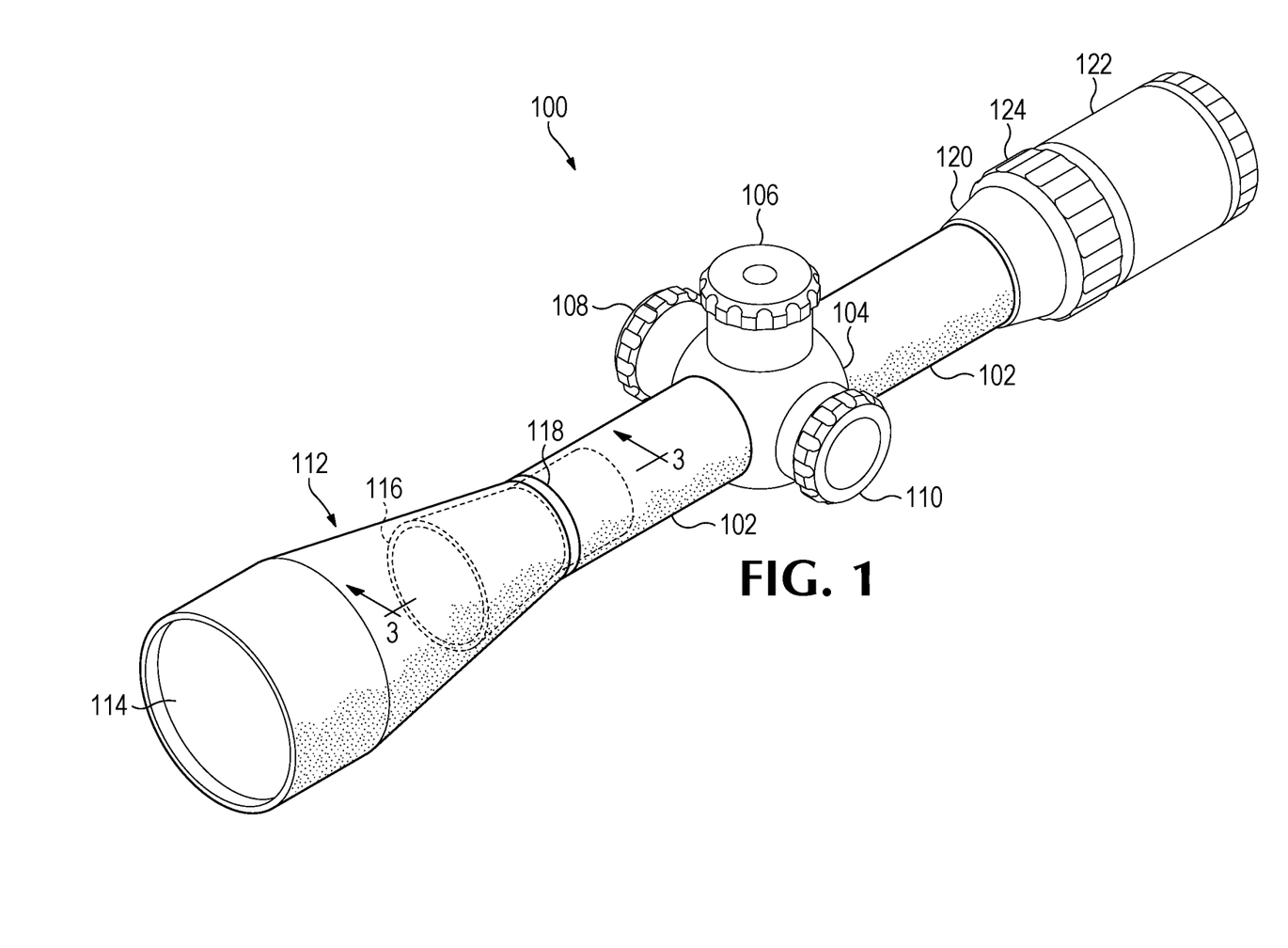
FIG. 1 is a top side perspective view of a rifle scope according to the present invention with the internally disposed metal connector shown in dashed lines.

Referring to FIG. 1 in one preferred embodiment the present invention takes the form of a rifle scope 100 having a composite material main tube 102, which supports a turret 104 having an elevation adjustment knob 106, a windage knob 108 and a focus knob 110. A composite material objective bell 112 supports an objective lens assembly 114 and partially houses a metal connector 116 at the bell's proximal end. Connector 116 is also partially housed at its proximal end by the distal end of main tube 102, and thereby connector 116 joins main tube 102 to objective bell 112. A ring 118 or washer may fit over connector 116 to help create a smooth external seam along the joint between main tube 102 and objective bell 112. In an alternative embodiment (see FIG. 2B), ring 118 may be integral to connector 116. Also, at the proximal end of scope 100, an eyepiece adapter 122 supports a zoom adjustment ring 124.

Main tube 102 may vary in size but is generally a hollow cylinder. In a preferred embodiment, tube length will be 201 mm. In another embodiment, the tube length will be 205 mm. The tube length may vary, and in some embodiments, ranges in size between 84 and 246 mm. The typical outer diameter may range from 19 mm to 40 mm, although sights intended for long range or low light usage, or both, may feature larger main tube diameters. In one embodiment, main tube 102 will have a diameter of 30 mm. The internal diameter of main tube 102 influences the amount of light that passes through scope 100. Main tube 102 may also house various lens elements, in addition to housing the internal parts supporting elevation, windage, and focus adjustments controlled by the elevation adjustment knob 106, windage knob 108, and a focus knob 110, respectively. Connector 116 is also housed, at least partially, at the distal end of main tube 102. In one embodiment, the outside surface of the proximal end of connector 116 is adhered to the internal surface of the distal end of main tube 102.

Figure 2A:
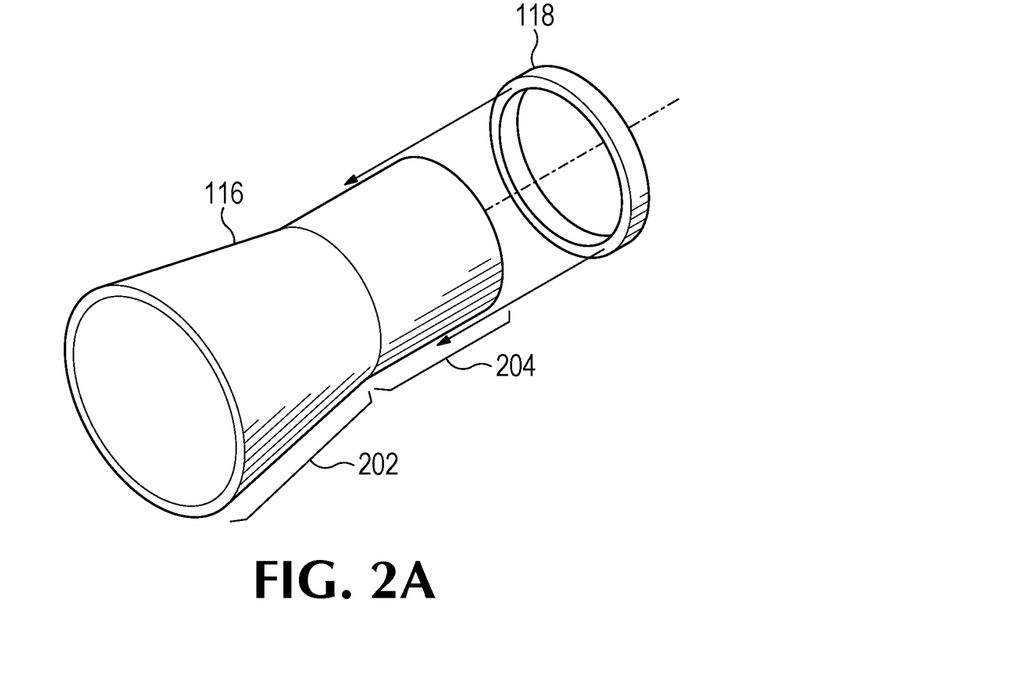
FIG. 2A is a top side perspective view of one embodiment of the connector and ring.
Figure 2B:
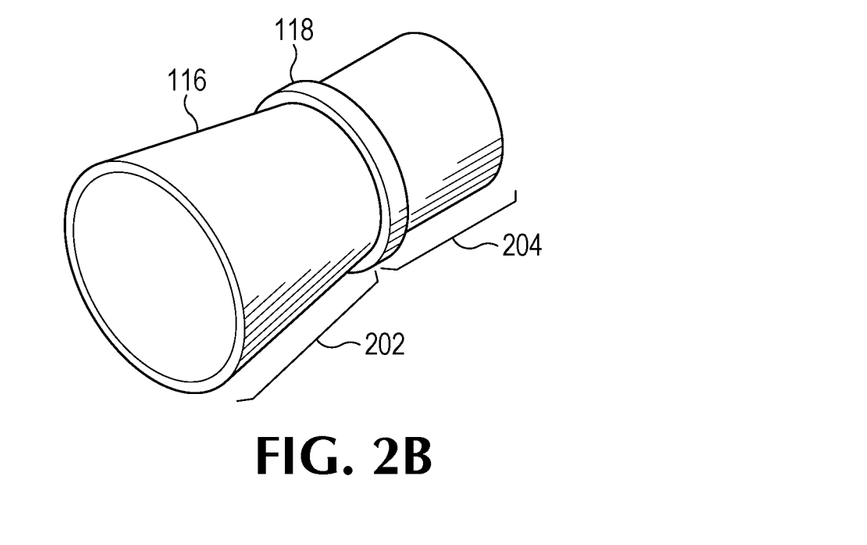
FIG. 2B is a top side perspective view of an alternative embodiment of the connector and ring, with the ring integral to the connector.

Connector 116 is metal, manufactured in a preferred embodiment out of a precipitation-hardened aluminum alloy such as 6061-T6 aluminum. Magnesium alloys may also be used. Alternative alloys include: 2219-T62; 2014-T6; 2024-T42, T3, T81; 6066 T6; 7075-T73; 6063-T52; 6063-T4; KS651 and KD610. Referring to FIG. 2A, connector 116 may be generally divided into two sections: a conic bell section 202 at the distal end, and a cylindrical tube section 204 at the proximal end. Like main tube 102, connector 116 may come in a wide range of sizes. In a preferred embodiment, the connector tube section 204 has a substantially constant outer diameter matching the internal diameter of main tube 102. The thickness of the connector sidewall is constant throughout. The internal diameter of bell section 202 increases from its proximal to distal ends and matches at its proximal end the internal diameter of tube section 204. In a preferred embodiment, it will have a length of approximately 65 mm. Other embodiments, however, will be between 27 mm and 78 mm. Yet other embodiments will be larger or smaller, so long tube section 204 is shorter in length than main tube 102 and bell section 202 is shorter in length than objective bell 112. As shown in FIG. 1, connector tube section 204 is housed, either partially or wholly, within main tube 102; while bell section 202 may be housed, either partially or wholly, within objective bell 112. Thus, connector 116 joins objective bell 112 to main tube 102.

Ring 118 is a metal cylinder having a sidewall gauge or thickness substantially similar to the thickness of the sidewalls of main tube 102 and objective bell 112. The length of ring 118 may vary but is less than the length of tube section 204. In a preferred embodiment, the ring 118 has a length of 4 mm. Ring 118 has an outer diameter matching the diameter of main tube 102. The internal diameter of metal ring 118 also matches the external diameter of tube section 204, such that ring 118 is configured to fit over tube section 204 and sit flush with the external surfaces of objective bell 112 and main tube 102 in fully constructed rifle scope 100. The ring may be any length less than the length of tube section 204, but in a preferred embodiment measures about 4 mm. In a preferred embodiment, ring 118 is constructed out of the same precipitation-hardened aluminum alloy as connector 116. However, metal ring 118 may be formed out of any suitable material, including other metals, and need not be formed of the same material as connector 116. Note that in one alternative embodiment, ring 118 is formed integrally with connector 116.

Figure 3:
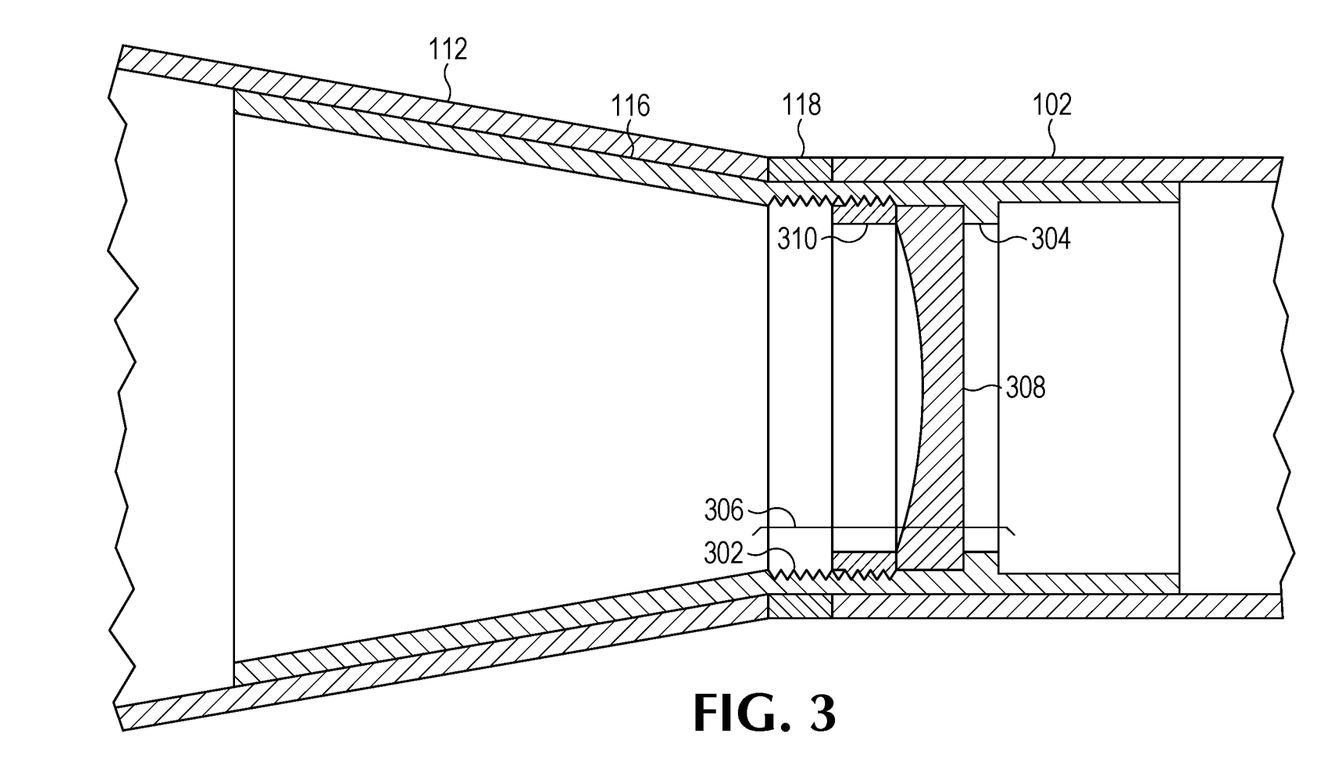
FIG. 3 is an enlarged sectional view of a portion of the rifle scope of FIG. 1 along view line 5 of FIG. 1.

In an alternative embodiment, in addition to joining objective bell 112 to main tube 102, connector 116 functions as a lens support assembly. FIG. 3 depicts an enlarged sectional view of a portion of the rifle scope 100 along view line 5 of FIG. 1. The internal surface of the sidewall of connector 116 will be fabricated with both a threaded region 302 at the distal end of the tube section 204, and a circular lip 304. Together, threaded region 302 and lip 304 define and bound a lens housing area 306 in the internal surface of connector 116. The lens housing area 306 holds a lens 308, secured in place by lens insert 310.

Lens insert 310 may be made of any suitable material, but in at least one embodiment, it is a metal cylinder with external threading corresponding to the threads of threaded region 302 on the internal sidewall of connector 116. In one embodiment, lens insert 310 is a locknut. Both lens insert 310 and lens 308 have a diameter substantially similar to the internal diameter of tube section 204 of connector 116. The length of lens insert 310 may match the length of threaded region 302, but in one embodiment the length of lens insert 310 is substantially less than the length of threaded region 302, in order to maximize the amount of light that can reach lens 308. As depicted in FIG. 3, in one embodiment, the length of lens insert 310 is half the length of threaded region 302, and lens insert 310 is threaded into threaded region 302 until the insert's proximal end abuts lens 308.

Lens 308 may be any type of lens. In the preferred embodiment, lens 308 is an intermediate focus lens such as a Petzval lens or a Barlow lens. Lens 308 has a diameter substantially similar to the internal diameter of connector 116, and is housed within the connector between lip 304 and lens insert 310.

In various embodiments, the various work pieces may be adhered together using an adhesive. Suitable adhesives will include most types of epoxy, including MGS Epoxy-285 resin. Bonding may also be improved though the use of various surface treatments on the workpieces.

3. METHOD OF MAKING A TWO-PART COMPOSITE RIFLE SCOPE ASSEMBLY

There are at least four methods of producing two-part composite rifle scope 100. In one method, connector 116 is formed integrally with objective bell 112 during the manufacture of objective bell 112. In another embodiment, objective bell 112 is manufactured separately from connector 116, and the pieces are brought together along with the independently formed main tube 102 during the assembly of scope 100. In yet another method, connector 116 is formed integrally with main tube 102 during the manufacture of main tube 102. In a fourth method, connector 116 is formed integrally with both objective bell 112 and main tube 102, which are formed simultaneously in the same mold using two pieces of woven fiber material. The first method is described in the greatest detail, but so that the invention is not unnecessarily obscured, many details described with regard to the first method of production have been omitted during the description of the other methods of production. The other methods of production may incorporate some of these details. For example, prepreg is described as an alternative to woven fiber material regarding the Integrated Connector-Objective Bell Method. Prepreg is also, however, a suitable alternative to woven fiber material for each of the other three described methods of production.

I. The Integrated Connector-Objective Bell Method

Figure 4:
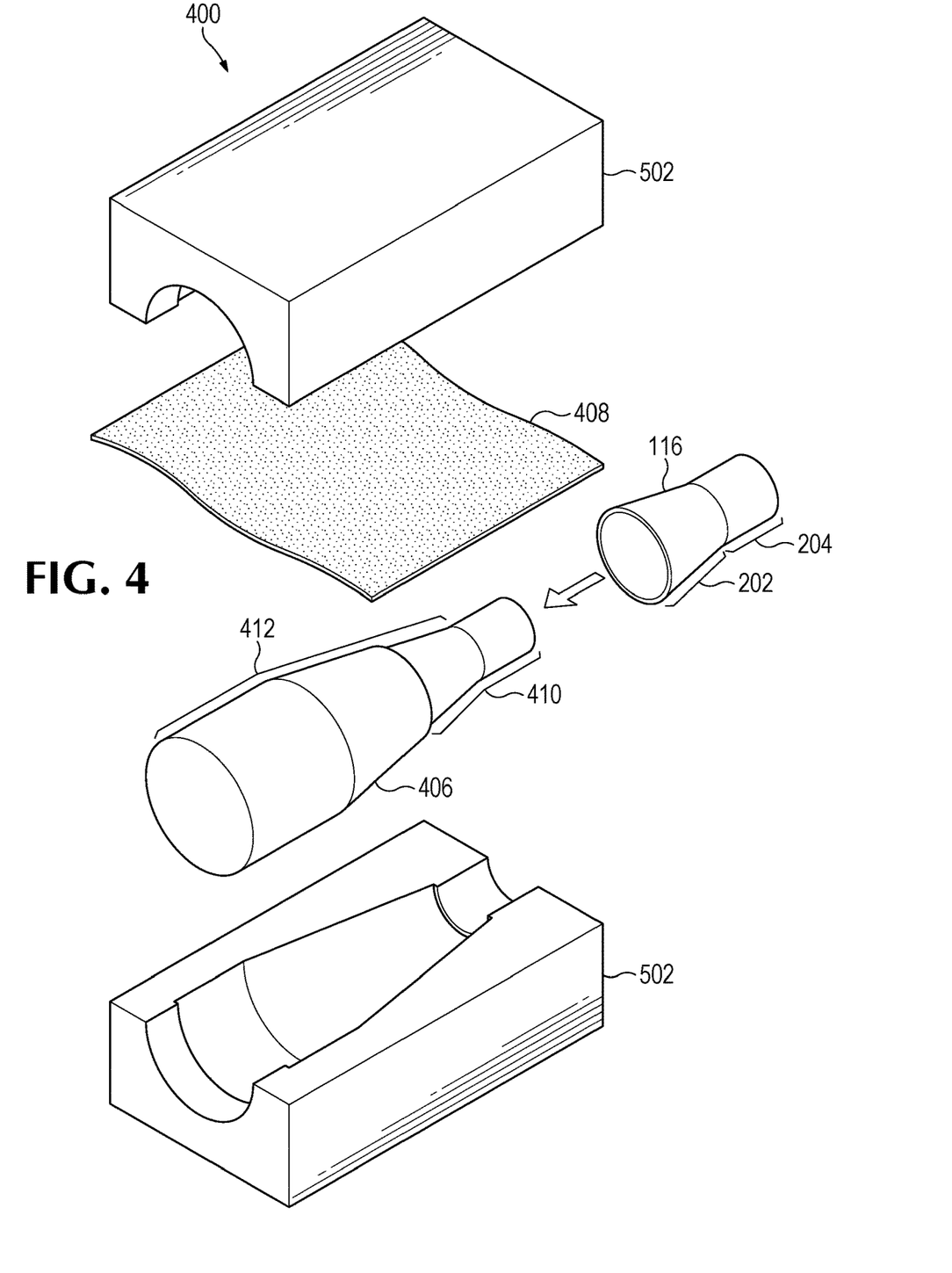
FIG. 4 is an exploded isometric view of a spud and connector . . . the layering of materials/work pieces used to create an objective bell adhered to a metal connector on a spud, to facilitate production of a first part of a two-part composite rifle scope assembly, according to one embodiment of the present invention.
Figure 5:
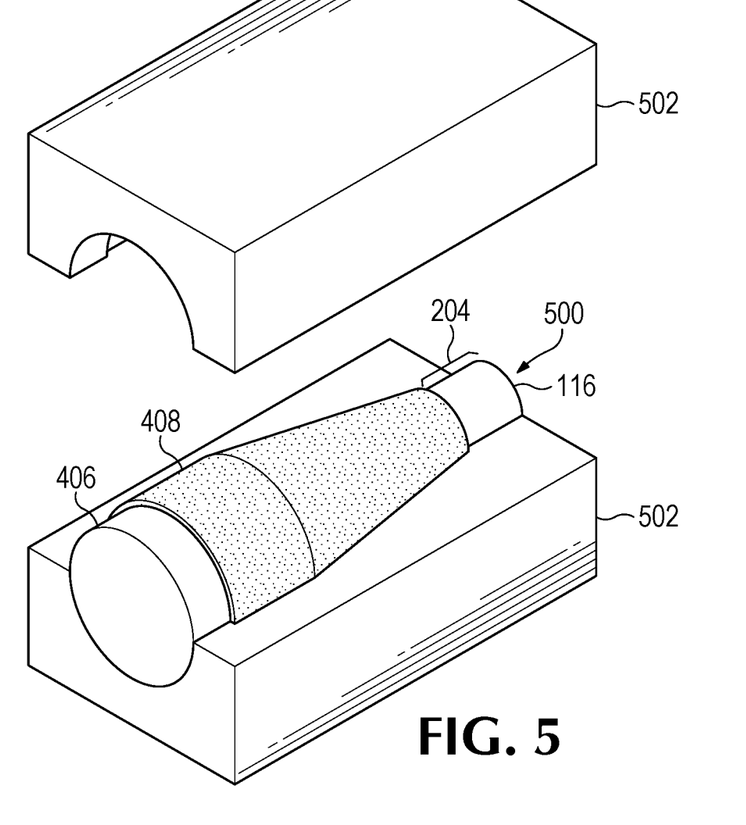
FIG. 5 is an isometric view of the spud and connector of FIG. 2 as wrapped in composite material and placed in a mold during the production of the first part of the two-part composite rifle scope assembly according to one embodiment of the present invention.

FIGS. 4-5 collectively show a stage in the construction of scope 100 using an integrally formed connector-objective bell assembly. In particular, FIG. 4 is an exploded isometric view of the work pieces 400 used to create an objective bell 112 adhered to a metal connector 116 on a spud 406 which collectively form work piece 500 inside mold 502 of FIG. 5.

Referring now to FIG. 4, A rifle scope is formed according to the first embodiment by providing a cylindrical spud 406, woven fiber material 408, a mold 502, and a connector 116 to be placed about spud 406. Spud 406 is generally in the shape of an objective bell with a slight stepped recess 410. The stepped recess 410 marks a decrease in the spud diameter corresponding to a thickness or gauge of the connector 116 sidewall, such that, when connector 116 is fitted about spud 406 along the recess, the surface of the spud-connector work piece is smooth and does not step outwardly. Thus, spud 406 generally has dimensions matching the internal dimensions of an objective bell-connector assembly. Stated differently, spud 406 generally has dimensions matching the internal dimensions of objective bell 112 as it houses bell section 402 of connector 116 in completed scope 100. In some embodiments, for ease of manufacture, spud 406 may extend into the tube section of the connector, or even extend beyond both the distal end of the objective bell and the proximal end of the connector.

Referring to FIG. 5, the spud-connector work piece is wrapped in woven fiber material 408, preferably of basalt or carbon fibers, and the resultant work piece 504 is placed into mold 502. Note that the woven fiber material 408 may take the form of sheets to be wrapped around spud 406 (see FIG. 4), a woven fiber tube to be pulled over the spud-connector work piece (not depicted), or some combination of both. The woven fiber material 408 covers the work piece from bell section 402 of the connector 116, up to the end of the bell portion 412 (see FIG. 4) of the spud 406. Mold 502 is closed about work piece 504, with a charge of resin (preferably epoxy and hardener). In one embodiment, the charge of epoxy is a charge of epoxy MGS Epoxy-285 resin, with a mix ratio of 2:1 epoxy to hardener, which is available from cstsales.com. The resin is cured forming the first part of the two-part composite scope 100: an objective bell 112 of composite material adhered to metal connector 116, with tube section 404 extending outwardly from the work piece.

Curing may be achieved in a variety of ways. In a preferred embodiment, curing is achieved by heating. In one embodiment, the epoxy is heated to about 49° C. for about 14 hours. Note that the resin should be added to the mold, heated, and handled so as to cause the resin to cover and become thoroughly inculcated into woven fiber material 408.

In a preferred embodiment, woven fiber material 408 may be pre-impregnated with resin ("prepreg" in industry parlance). In one preferred embodiment a particular prepreg available from TCR composites of Ogden, Utah, designated as AS4D/UF3325, fiber volume 60%, is used. The "AS4D" portion of this designator refers to a carbon fiber that is available under the HexTow® mark from HexCel Corporation of Stamford, Conn. The "UF3325" portion refers to a proprietary TCR composites resin, with the following properties for the neat resin (properties of the essential polymers of the resin):

Tg (RDS G"): 255° F. (123.89° C.)
Tensile strength: 10.5 ksi
Tensile modulus: 406 ksi
Elongation: 4.6%
Density (cured): 1.208 g/ee
Where Tg is the glass transition temperature.

In a preferred embodiment this prepreg is placed about the spud and baked at an increasing temperature for two hours, at which point it should reach 300° F., at which temperature is baked for two hours more and then permitted to slowly cool for two hours. The finished product has approximately the following properties:

Tensile strength: 315 ksi
Tensile modulus: 21.7 msi
Elongation: 1.3%
NOL short beam shear: 7.6 ksi
Typical pressure vessel hoop fiber strength translations: 80-90%.

The formed objective bell-connector assembly is removed from the mold. Spud 406 is removed along with any excess woven material. Objective bell 112 now comprises composite material formed by resin Composite material main tube 102 is formed similarly to composite material objective bell 112. A tubular spud is wrapped in a woven fiber material 802 or prepreg before being placed in a mold having the dimensions of the manufactured main tube 102. Woven fibers 802 may be the same as woven fiber material 408 or different. Where the woven fiber material 802 has been used as opposed to prepreg, a charge of resin is applied before the mold is closed and cured. Once cured, main tube 102 is removed from its mold. The main-tube spud is removed from the tube, along with any excess material, to provide fully formed composite material main tube 102.

Figure 6:
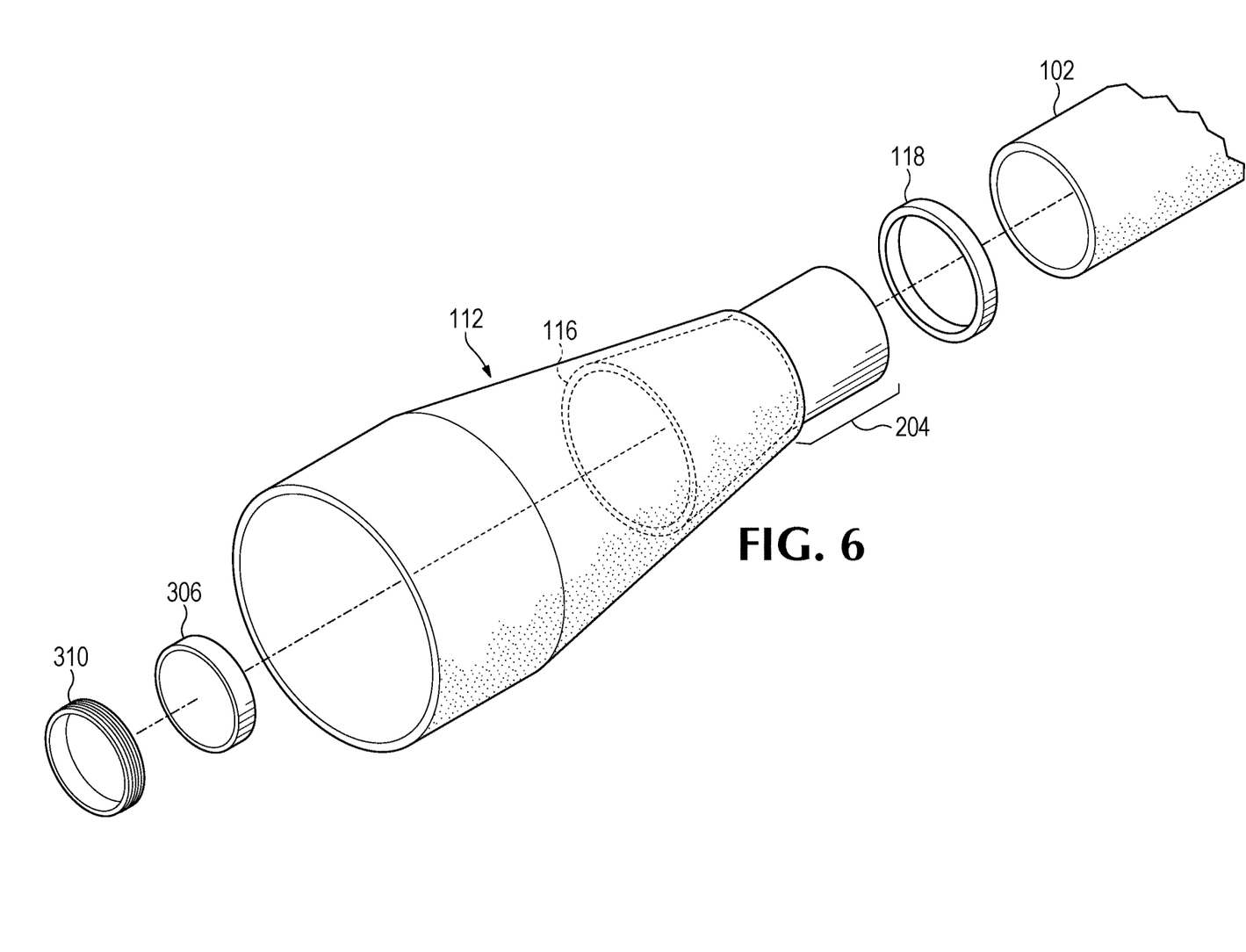
FIG. 6 is an isometric, exploded partial view representing a portion of the rifle scope of FIG. 1, showing obscured sections of the connector in dashed lines.

Next, referring to FIG. 6, adhesive is optionally applied to the external surface of tube section 404 of connector 116, where it extends outwardly from objective bell 112. If adhesive is used, the adhesive may be applied at least at the distal end of connector tube section 404 where the adhesive will ultimately secure metal ring 118 to connector 116 adjacent to the proximal end of objective bell 112. Alternatively, or additionally, adhesive may be applied to the internal surface of ring 118.

Ring 118 is placed about tube section 204 and shimmied along connector 116 distally until the ring's distal end is adjacent to the proximal end of objective bell 112. If adhesive has been used, the ring will now be adhered along the distal end of connector tube section 204.

Adhesive is introduced inside the distal end of main tube 102. Alternatively, or additionally—if the adhesive had not been previously applied to that region—adhesive is applied to the exposed exterior surface of connector tube section 204. The distal end of main tube 102 is fitted over outwardly extending connector tube section 204 and shimmied distally down connector tube section 204 until the distal end of main tube 102 abuts the proximal end of ring 118. Ring 118 is now mechanically fixed between objective bell 112 and main tube 102 about connector 116 completing the shell of rifle scope 100.

Referring again to FIG. 6, connector 116 is stood on end with the distal end pointed upward. Adhesive may be applied to the inside of connector 116 at least at the lens housing area 306, or to the external sidewall of lens 308, or both, before the lens is lowered into the connector. More adhesive may then be added at least to the exposed proximal portion of threaded region 302 of the connector, before lens insert 310 is lowered in. Lens insert 310 is then screwed into the threads of the connector until the insert abuts lens 308, as shown in FIG. 3. Thus, lens insert 310 mechanically secures lens 308 inside the connector against connector lip 304, with the insert itself being at least mechanically secured to the internal sidewall of connector 116, but may also be further secured to connector sidewall by the adhesive.

II. The Independent Work Piece Method

In an alternative method of production, objective bell 112 and main tube 102 are each produced independent of connector 116, and the fully formed pieces are brought together during the assembly of scope 100.

Objective bell 112 is formed about spud 406 independently from connector 116. In this embodiment, the composite objective bell would be formed by wrapping a spud generally in the shape of an objective bell with woven fiber woven fiber material 408, as previously described. In this instance, however, the spud has no recess corresponding to the connector. The objective bell work piece would then be placed into a mold with a charge of resin and cured, as described above. Formed objective bell 112 is removed from the mold and, after removing the spud 406, an adhesive would be placed on the internal surface of bell, the external surface of connector 116, or both. Connector 116 would be placed into the formed bell such that the tube section 204 of the connector extends outwardly from the distal end of the objective bell and the sidewall of the bell portion of the connector contacts and is adhered by the adhesive to the internal surface of the sidewall at the proximal end of connector bell section 202. Ring 118, main tube 102, lens 308, and lens insert 310 are assembled into rifle scope 100, as described above.

III. The Integrated Connector-Main Tube Method

Figures 7, 8:
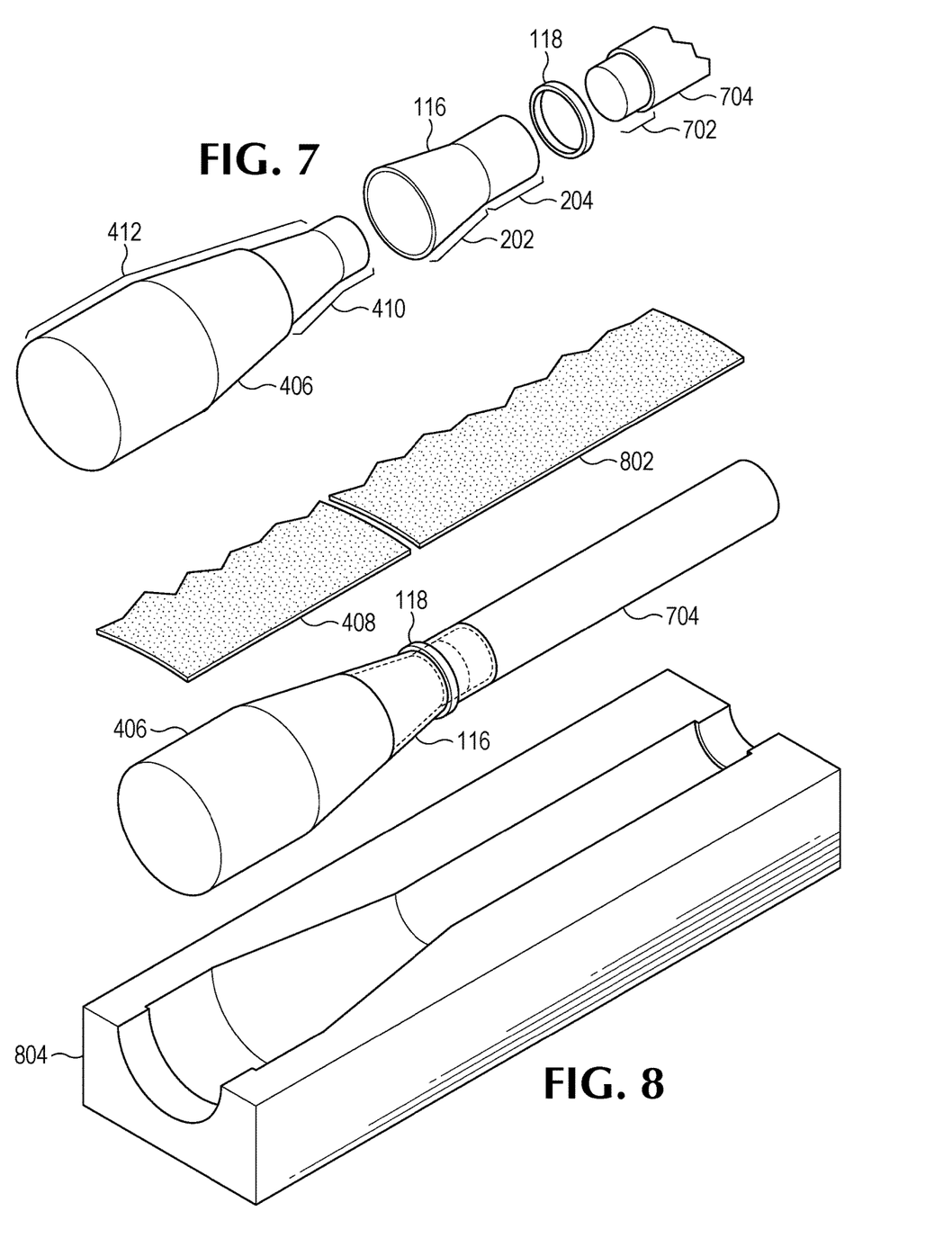
FIG. 7 is an exploded isometric view of a work piece used to facilitate the production of a two-part composite rifle scope assembly, the work piece including two spuds with ends conforming to the internal space of a connector, and a ring with an internal diameter fitting about the proximal section of the connector.
FIG. 8 is an isometric view of the work piece of FIG. 6, at a further stage in the manufacturing process, showing the composite material to be wrapped about the work piece, and placed into a mold.

Referring to FIG. 7, in another alternative method of production, connector 116 is formed integrally with main tube 102 during the manufacture of main tube 102. Main tube 102 is formed on a main-tube spud 702, as described above, but with a slight recess 704 at the distal end of spud. The recess causes the distal section of the main-tube spud to have a diameter matching the internal diameter of connector tube section 204. Ring 118 is fitted about the distal end of connector tube section 204 before the tube section itself is fitted about slight recess 704 so that the connector section sits flush with the external surface of the rest of main-tube spud 702. Connector tube section 204 and main-tube spud 702 are wrapped in a tube or sheet of woven fiber material 706 from the proximal end of ring 118 to a proximal point on spud 702 corresponding to the proximal end of formed main tube 102 before being placed in a mold with a charge of resin. After the resin is cured, according to the previously described methods, the main-tube work piece is removed from the mold. Main-tube spud 702 is removed from composite material main tube 102, along with any excess material. Main tube 102 is then fully formed with connector 116 adhered to the internal surface of the tube at the tube's distal end. The main-tube-connector work piece may be joined to objective bell 112. In one embodiment, the bell is formed by placing connector bell section 202 of the workpiece about spud 406 and forming objective bell 112 as described above: wrapping the spud and connector bell section 202 with woven fiber material 408, placing the work piece in a mold a charge of resin, and curing.

In a related method of production, objective bell 112 is formed such that the bell's diameter at its proximal end is larger than ring 118. Thus, the bell may be adhered to the main-tube-connector work piece by fitting the proximal end of the main tube through the distal end of objective bell 112 and pulling the piece through the bell until the external surface of bell section 202 is adjacent to the internal surface of objective bell 112 where it may be adhered with adhesive.

IV. The Fully Integrated Method

In yet another method of production, connector 116 is formed integrally with both objective bell 112 and main tube 102, which are formed simultaneously in the same mold using two pieces of woven fiber material. Ring 118 is fitted about the distal end of connector tube section 204, where it may be adhered. As depicted in FIGS. 7 and 8, rifle scope 100 is then formed using two spuds: bell spud 406, and main-tube spud 702 with a diameter matching the internal diameter of main tube 102.

As shown, bell spud 406 has stepped recess 410 at its proximal end, while main-tube spud 702 has slight recess 704 at its distal end. As described above, the stepped recess 410 causes the proximal end of bell spud 406 to conform to the internal dimensions of connector bell section 202. The slight recess of the main-tube spud causes the distal end of the spud to have dimensions corresponding to the internal dimensions of connector tube section 204. Connector bell section 202 is fitted about the recessed portion of bell spud 406, while connector tube section 204 is fitted about the recessed portion of the main-tube spud. Thus, the proximal end of bell spud 406 is adjacent to the distal end of the main-tube spud inside of connector 116.

Figure 9:
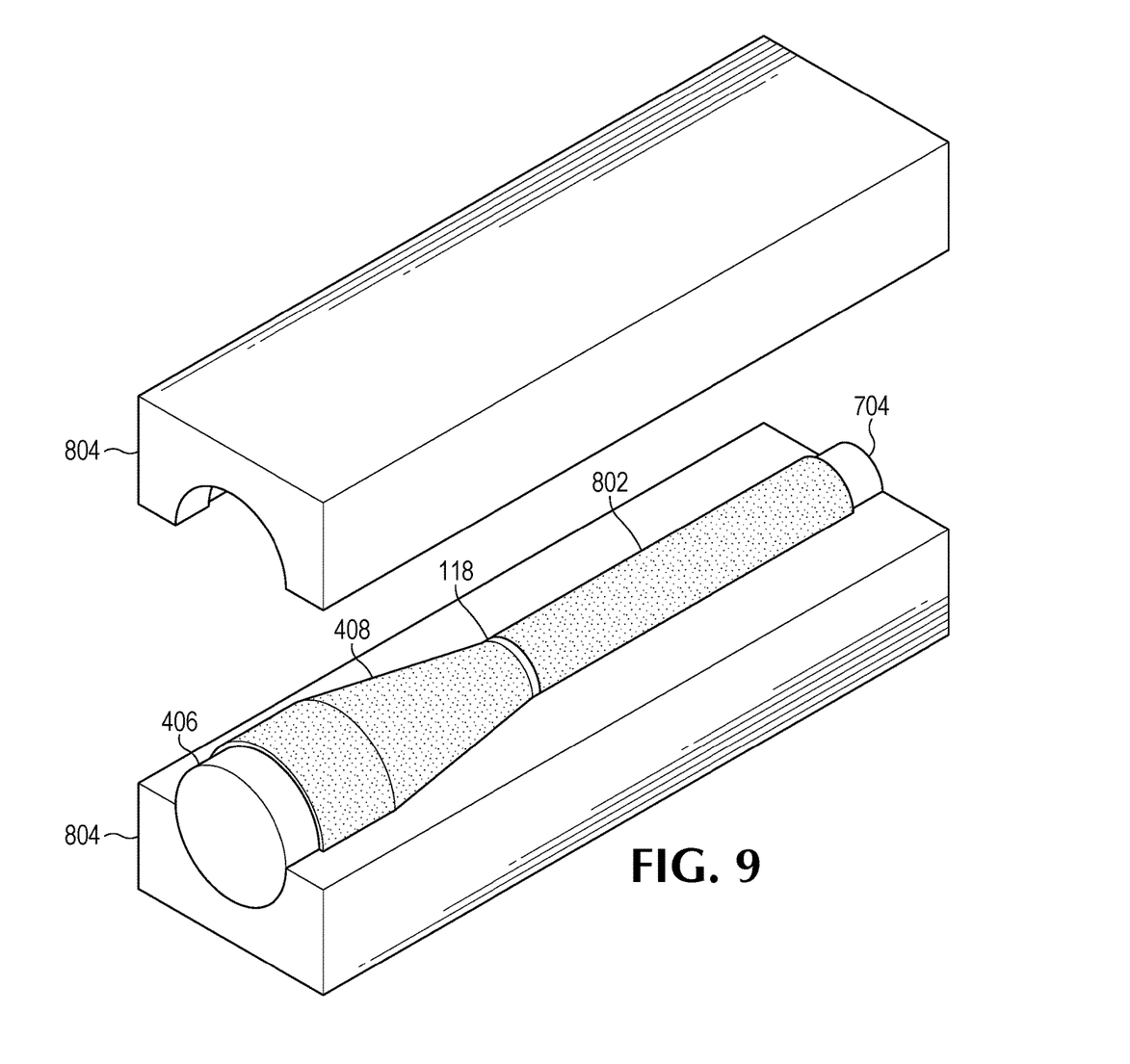
FIG. 9 is an isometric view of the wrapped work piece of FIG. 7 as placed into a mold at a further stage in the manufacturing process.

The work piece is then wrapped in woven fiber material 408, as previously described and depicted in FIGS. 8 and 9, but using two pieces of material (woven fiber material 408 and 802), on each of two sections: (a) from a distal point on the spud corresponding to the distal end of the formed objective bell 112, over connector bell section 202, to the distal end of the ring 118, which steps outwardly from the rest of the work piece; and (b) from the proximal end of ring 118, over the exposed surface of connector tube section 204 to a proximal point on the main-tube spud corresponding to the proximal end of formed main tube 102. The work piece is placed into a mold 804 with charges of resin for each of the two sections. The resin is cured, preferably with heat, as previously described. Once cured, the work piece is removed from the mold, and the spuds are removed from the work piece along with any excess material. The result is a fully formed composite material objective bell 112 and main tube 102 joined via connector 116.

4. CONCLUSION

The disclosed embodiments are illustrative, not restrictive. While specific configurations of the rifle scope have been described, it is understood that the present invention can be applied to a wide variety of optical sighting devices. There are many alternative ways of implementing the invention.

What is claimed is:

1. A scope assembly, comprising:
an objective bell, made of composite material, having a circular sidewall and a proximal end, said sidewall having an interior surface, said bell increasing in diameter as it extends distally from said proximal end;
a main tube having a circular sidewall and a distal end, said sidewall having an interior surface and further having a constant diameter, and wherein said distal end of said main tube is adjacent to said proximal end of said objective bell;
a connector, made of metal, positioned about said distal end of said main tube and having an exterior surface wherein a distal end of said exterior surface is conformal to said increasing diameter of said interior surfaces of said proximal end of said objective bell and a proximal end of said exterior surface is conformal to said constant diameter of said distal end of said main tube, and further wherein said exterior surface is adhered by an adhesive to said interior surfaces of said main tube and said objective bell, thereby joining together said objective bell and said main tube;
an eyepiece on said proximal end of said main tube; and
an optical train interlaid between said eyepiece and said distal end of said main tube.

2. The scope assembly of claim 1, wherein said main tube is made of composite material.

3. The scope assembly of claim 1, wherein said composite material includes carbon fiber.

4. The scope assembly of claim 1, wherein said connector supports a lens.

5. The scope assembly of claim 4, wherein said lens is a Petzval lens.

6. The scope assembly of claim 4, wherein said lens is a Barlow lens.

7. The scope assembly of claim 1 further comprising a ring positioned about said connector between said distal end of said main tube and said proximal end of said objective bell.

8. The scope assembly of claim 7, wherein said ring is integral to said connector as an outwardly stepped portion on said exterior surface of said connector.

9. A method of making a scope assembly, comprising:
providing an objective bell, made of composite material, having a circular sidewall and a proximal end, said sidewall having an interior surface, said bell increasing in diameter as it extends distally from said proximal end;
providing a main tube having a circular sidewall and a distal end, said sidewall having an interior surface and further having a constant diameter,
placing said distal end of said main tube adjacent to said proximal end of said objective bell; and
providing a connector made of metal having an exterior surface with a distal end of said exterior surface that is conformal to said increasing diameter of said interior surfaces of said proximal end of said objective bell and a proximal end of said exterior surface is conformal to said constant diameter of said distal end of said main tube and positioning said connector about said distal end of said main tube and adhering said connector to said interior surfaces of said main tube and said objective bell, thereby joining together said objective bell and said main tube.

10. The method of claim 9, further comprising providing a metal ring having an interior surface conforming to said exterior surface of said connector and adhering said ring to said exterior surface between said objective bell and said main tube.

* * * * *